INVENTOR.
ROBERT J. HERSCHLER
ATTORNEYS

United States Patent Office 3,743,727
Patented July 3, 1973

3,743,727
ENHANCING TISSUE PENETRATION OF CERTAIN ANTIMICROBIAL AGENTS WITH DIMETHYL SULFOXIDE
Robert John Herschler, Camas, Wash., assignor to Crown Zellerbach Corporation, San Francisco, Calif.
Continuation-in-part of application Ser. No. 753,231, Aug. 16, 1968, which is a continuation-in-part of abandoned application Ser. No. 329,151, Dec. 9, 1963. This application Nov. 16, 1970, Ser. No. 89,787
Int. Cl. A01n *19/00;* A61k *21/00*
U.S. Cl. 424—181                                                                  21 Claims

ABSTRACT OF THE DISCLOSURE

A method of enhancing tissue penetration of antimicrobial agents selected from the group consisting of sulfonamides, penicillins, antiviral agents and antibiotics produced by species of Streptomyces by conjointly applying the agent to the tissue with dimethyl sulfoxide. Penetration of the skin and the mucous membranes of the body cavities by these agents may be enhanced by conjoint application of such agents and dimethyl sulfoxide (DMSO) directly to such membranes. Preferably, for penetration of agents through the skin compositions of DMSO at concentrations of 50% and above are employed and for penetration through mucous membranes, compositions including DMSO at concentrations of 10% and above are employed.

CROSS REFERENCES TO RELATED APPLICATION

Figure 1:
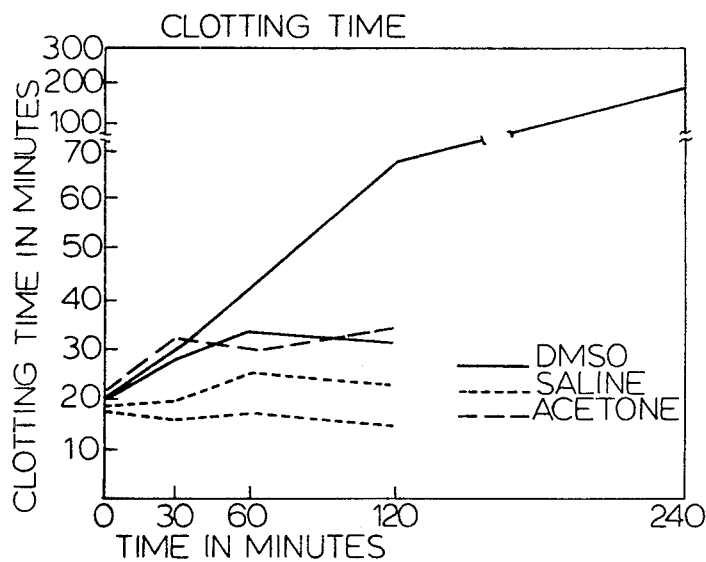
Figure 2:
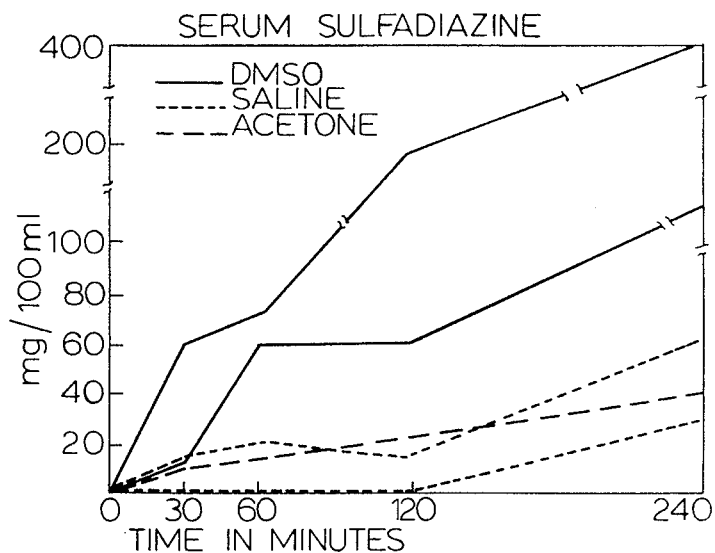

This is a continuation-in-part of copending application Ser. No. 753,231, filed Aug. 16, 1968, now U.S. Pat. 3,551,554 issued Dec. 29, 1970, which in turn is a continuation-in-part of Ser. No. 329,151, filed Dec. 9, 1963, now abandoned.

BACKGROUND OF THE INVENTION

The predominant and limiting problem in the development and use of antimicrobial agents used in inhibiting the growth of various microorganisms is the inability to administer them as effectively as is desired. In particular, there is often a limitation as to the routes of administration because of the following factors:

(1) Some agents are inactivated in the gastrointestinal tract or they are absorbed poorly into the body from the tract. Also, undesirable side effects may result which prevent effective oral administration.

(2) In every case where injection must be resorted to, there is a risk of needle injury, infection, and other trauma (including the emotional trauma inevitably associated with injections).

(3) Few agents are absorbed through the skin or mucous membranes in effective quantities and the rate of absorption is less than would be desirable for those that do.

(4) A local concentration for a local effect is often desired but a larger *systemic* dose must be given to achieve an effective concentration at the local area when the agent can only be injected or given orally, (but not topically). This higher dose often causes undesirable side effects, since dosage related side effects are very prevalent for many agents.

Animal tissues comprise various membranes which are selectively permeable and which allow some substances to pass freely, while rejecting others or permitting only slight passage. Such membranes comprise the body coverings and externally communicating cavities, including the skin and mucous membranes of the body cavities, e.g. alimentary tract, respiratory tract, genitourinary tract, oral cavity, eyes, etc. (collectively defined herein as external membranes). They also include internal membranes such as the linings of the various organs and other internal body structures, e.g. peritoneum and pleura, and the membranes surrounding cellular and intracellular structures. It is desirable in overcoming the aforementioned problems in administration of antimicrobial agents, to increase the passage or penetration of agents across such membranes and further to enhance their intercellular and intracellular diffusion in order for them to reach their situs of activity more rapidly to achieve the desired response more quickly and often more effectively. It is exceptionally desirable to do this in a reversible manner, by which is meant penetration of the agents into tissue without adversely affecting or impairing the function or structure of the tissue. It is known that certain substances will penetrate tissue only after the tissue has been irreversibly damaged which is certainly undesirable. Certain agents, such as surfactants, have been known previously for increasing penetration of various agents. However, again, such penetration was effected only through irreversible damage of the tissue.

It has been a major rule in medicine that the "vehicles" or "carriers" have relatively little effect on the penetration rate for a given agent and this rule generally still holds true .Thus, with conventional carriers for medicines, such as alcohol, Carbowax, water, etc., few agents will adequately penetrate such formidable external membrane barriers as the intact skin or mucous membrane. It is to be expected that this would be true of all potential "vehicles" or material combined with antimicrobial agents. However, surprisingly, it has been discovered that dimethyl sulfoxide (DMSO) has the unusual ability to greatly enhance the penetration of antimicrobial agents when they are applied to such membrane barriers along with dimethyl sulfoxide. The penetration of antimicrobial agents which previously have not penetrated these membranes to an effective degree may be enhanced sufficiently so that a useful result may be obtained. The penetration of antimicrobial agents which have been known to penetrate to a limited degree in conventional vehicles may be significantly enhanced. New and convenient routes of administration, often with a decrease in side effects of the agents, better localized concentration and a more sustained activity, may thereby be created for many antimicrobial agents.

In my co-pending application (Ser. No. 615,377, filed Feb. 13, 1967) is disclosed my related discovery that DMSO enhances the penetration of plant-active agents (pesticides, dyes, nutrients, hormones, herbicides, and the like) into plant tissue in a highly unusual manner.

Dimethyl sulfoxide is a water-white liquid at room temperature having a freezing point of approximately 18.5° C. and a specific gravity of approximately 1.1. Dimethyl sulfoxide is a well known industrial solvent and it has been available in commercial quantities for at least a decade (from Crown Zellerbach Corporation, San Francisco, Calif.). DMSO was originally synthesized in 1866 and since that time it has been extensively investigated for possible industrial and biological utility and a considerable amount of literature has developed on its properties and uses. Over the last 25 years it has found widespread use as a solvent in industry and in the laboratory.

DMSO has been investigated in the past for various biochemical uses, for example as a reaction solvent for preparing derivatives of various proteins, and antibiotics, as an extraction solvent for various proteins, as an analytical solvent and as a solvent for various other laboratory uses. It has also been suggested as a solvent for certain pesticides.

DMSO has been investigated as a preservative agent for in vitro storage of chilled or frozen tissue and it has also been determined to have a protective effect in experimental animals subjected to irradiation following injection of DMSO into such animals.

In connection with topical application of the antifungal agent griseofulvin, DMSO has been listed along with various inert materials as "bland, high boiling fluids" to be used as carriers for the griseofulvin in applying it to the skin to control fungus growth in the skin. It has also been suggested to employ DMSO as a carrier or solvent, for 1:2-benzisothiazolone derivatives, which said derivatives are alleged to have antibacterial and antifungal activity. DMSO has been employed as a solvent for iodine and for preparation of certain injectable formulations, namely chloramphenicol and an anthelminic preparation.

Despite the employment of DMSO as a solvent for these purposes and despite general experimentation with DMSO in the medical field, the unique ability of DMSO to alter membrane permeability and to thereby enhance penetration of chemotherapeutic agents was neither suggested nor discovered. Although DMSO has been a well known and widely investigated solvent for many years, its unique ability to enhance penetration of external and internal membrane barriers as contemplated in the present invention has been totally unrecognized.

SUMMARY OF THE INVENTION

The present invention relates to a method of enhancing penetration into and across the external membrane barrier of an animal subject of an antimicrobial agent selected from the group consisting of sulfonamides, penicillins, antiviral agents and antibiotics produced by species of Streptomyces which comprises the concurrent topical administration to the external membrane of an amount of the aforementioned agent effective to inhibit the growth of a desired microorganism and an amount of DMSO sufficient to effectively enhance penetration of the agent to achieve the desired growth inhibition.

By a mechanism or mechanisms not yet fully understood, DMSO, when applied to animal tissue, increases the permeability of the tissue in a reversible manner to cause a much greater penetration rate for conjointly applied antimicrobial agents. Although the mode of activity is still unclear, it is definitely not that of the simple "vehicle" or "carrier" since the effect may be obtained to some extent even when the DMSO is applied to the tissue separately and the enhanced penetrability of the tissue may last for as much as three hours after the DMSO treatment.

When applied to the intact skin along with dimethyl sulfoxide, particularly at a DMSO concentration of 50% by weight and above, or to skin pretreated with the dimethyl sulfoxide, an agent, may penetrate rapidly to and saturate the stratum corneum (the highly resistant "horny layer" of the skin which is the major barrier to penetration). The agent continues to penetrate through the skin from this "reservoir" in the stratum corneum to the underlying tissue and into the circulatory system.

Similarly, penetration into underlying tissues and into the circulatory system may be obtained from topical application to the mucous membranes of the body cavities as in the case of intraoral, conjunctival sac, rectal, vaginal, and bladder instillation administration, particularly where the DMSO is utilized at a concentration of 10% by weight and above. It is thus seen that a particularly important aspect of this invention is that penetration of antimicrobial agents may be effectively enhanced following topical administration. As used in this connection herein, the term "topical" is intended to include application to all external membrane barriers including the cutaneous or epidermis regions and the mucous membranes including the gastrointestinal tract, the respiratory tract and the genitourinary tract.

As previously indicated, the mechanisms of penetration enhancement are as yet fully elucidated. Accordingly, it is not intended to be bound to one specific theory of operation. However, it is believed that DMSO acts by several mechanisms in enhancing penetration. DMSO is believed to act directly on tissue to alter the general permeability of the tissue membrane. More specifically, DMSO when applied thereto, is believed to decrease the natural resistance of tissue membranes to penetration by foreign agents. DMSO is also believed to promote penetration by a direct transport effect, perhaps by the mechanism of complexing with the agent. This mechanism is believed more applicable to cationic and anionic agents.

GENERAL DESCRIPTION OF THE INVENTION

The present invention contemplates the growth inhibition of various microorganisms susceptible to antimicrobial agents from the group of sulfonamides, penicillins, antiviral agents and antibiotics elaborated by fermentation of Streptomyces species by topical application of the agent to animals in conjunction with DMSO. DMSO provides enhanced penetration of the antimicrobial agent to the locus of the microorganism whose growth is to be inhibited. DMSO may additionally provide a lowering of the resistance of the microorganisms to the agent, perhaps through action upon the cell wall of the microorganism.

This invention is applicable to the tissue or organisms of all animal phyla, DMSO having differing degrees of influence on penetration of various tissue types of a given animal. Animals of particular importance in the practice of the invention are the mammalians, especially man and veterinary animals. However, the invention may also be practiced with other vertebrates, as for example the amphibians, fishes, reptiles, etc. and with the lower species comprising the non-vertebrates.

As indicated previously, a measure of penetration enhancement may be obtained where the tissue is pretreated with DMSO prior to application thereto of the antimicrobial agent. The tissue penetrability is thus altered by such pretreatment and this reversible effect gradually diminishes and the tissue returns to its normal permeability state. However, for convenience and optimal effect, it is frequently desirable to administer the DMSO and the agent simultaneously in the same composition.

Penetration enhancement is generally non-selective in terms of the type of physiological effect or effects of antimicrobial agents to be transported across membrane barriers. The extent of penetration enhancement will depend upon many factors, the predominant factors being the relative natural permeability of the particular membrane, the concentration of DMSO applied, the extent of solubility of the agent in DMSO and the chemical and physical properties of the agent.

As a class, cationic agents meaning chemical compounds which dissociate into relatively small, mobile anion(s) and much less mobile cation(s) which are considerably larger than the anion(s) (e.g. having a radical weight ratio greater than 1 to 3, but more usually on the order of 1 to 10–100), appear to obtain the most pronounced penetration enhancement with DMSO. Even penetration of external membrane barriers such as the mucous membranes may be effected with these agents utilizing rather low amounts of DMSO, frequently as low as 10–20% by weight. Following Example 1 illustrates cationic agents. Anionic agents, meaning agents which dissociate into relatively small, mobile cation(s) and large, less mobile anion(s) which are considerably larger than the cation(s) (e.g. having a radical weight ratio greater than three to 1 but more usually on the order of 10–100 to 1) also obtain marked penetration enhancement with DMSO. Although lower concentrations of DMSO, as for example 15% by weight (see following Example 1), may be effected through various external membrane barriers, higher concentrations of DMSO are frequently desirable for maximum effect, e.g. 50% by weight and above, particularly for epidermal application. These agents are illustrated by following Examples 1 and 4.

Penetration of non-dissociating chemical compounds may also be beneficially enhanced with DMSO. Here again higher concentrations of DMSO, i.e. 50% and above, are frequently desirable for maximum effect, particularly for epidermal applications.

Penetration of agents which form complexes with DMSO are also beneficially enhanced.

The size of the compound obviously may influence to some extent the relative ability of agents to penetrate tissue. However, effective membrane penetration utilizing DMSO has been demonstrated for extremely large compounds, for example compounds having molecular weights exceeding 40,000. Even for such a formidable membrane barrier as intact human skin, quite large compounds have been demonstrated to be effectively enhanced; compounds having a molecular weight of 8,000 and above, can be effectively penetrated through the human epidermis in some cases.

Standard occlusion techniques frequently may increase the percutaneous absorption of the larger molecules. In general, good solubility of the agent in DMSO is desirable to achieve maximum benefit of the present invention. Naturally, the practitioner will select agents, routes of administration and composition forms guided by these well-known principles.

The concentration of DMSO applied to enhance penetration may vary over wide limits. The concentration selected is desirably related to the route of administration to be employed. For cutaneous application, compositions including at least about 50% by weight DMSO are preferable in that they have been found to increase percutaneous penetration in a highly significant manner. Maximum cutaneous penetration is generally attained with DMSO concentrations closely approaching 100% (excluding the antimicrobial agent), but with concentrations much above 90% by weight the incremental increase in penetration rate over that achieved at 90% often is relatively small. On the other hand, above a 90% concentration of dimethyl sulfoxide the side effects of a burning sensation and erythema increase significantly. Accordingly, for topical use, it may be desirable, consistent with physical stability of the composition, to formulate the DMSO in compositions containing a DMSO concentration of between about 50% and 90% by weight and containing water, preferably 10% by weight or greater.

Application to mucous membranes follows generally the procedure for cutaneous administration. However, lower concentrations of DMSO, for example as low as 10% by weight, may be preferred since penetration of mucous membrane is more easily affected.

The amount of the antimicrobial agent to be administered will obviously be an effective amount of the desired result expected therefrom. This, of course, will be ascertained by the ordinary skill of the practitioner. Due to enhanced activity which may be achieved through better penetration, the dosage of agent may often be decreased from that generally applicable. In accordance with the usual prudent formulating practices, a dosage near the lower end of the useful range of the particular agent may be employed initially and the dosage increased as indicated from the observed response, as in the routine procedure of the physician.

The microorganisms against which the antimicrobial agent and DMSO are to be employed are any of those conventionally treated with the antimicrobial agent. Reference is made to Table 56-1 (pages 1176-1180) of the book "The Pharmacological Basis of Therapeutics" (Third edition) by Goodman and Gilman (1965), for a listing of microorganisms and antimicrobials useful thereagainst.

As previously discussed, the DMSO may advantageously be compounded with the antimicrobial agent for concurrent administration. The usual pharmaceutical compounding agents, diluents or carriers may be included in these compositions as desirable for the particular route of administration and dosage form. The amount and type of diluent or carrier used should, of course, be consistent with the compatibility of the agent in DMSO and the diluent. A cosolvent or other standard adjuvant, such as a surfactant, may be called for to maintain the agent in solution or suspension at the desired concentration. Where stability of the agent in the presence of DMSO at the desired concentration is a problem, it may be desirable to prepare the formulation immediately before administration or to administer the DMSO and the agent separately to the tissue.

Dosage forms for topical application may include solutions (paints), nasal sprays, lotions, ointments (including creams and gels), suppositories and the like. The solutions and nasal sprays may simply comprise the agent dissolved in DMSO, optionally with an amount of water, glycerine or other diluent. For nasal sprays and other mucous membrane applications isotonic saline may be preferable as a diluent. The DMSO may be present in these forms in various concentrations, say from about 10% to about 75% by weight or higher.

Lotions and gels, ointments or creams, may contain the usual ingredients to provide a base, as for example cetyl alcohol, an emulsifier such as lauryl sulfate and water. Another base may be formulated by combining equal weight amounts of stearic acid, cetyl alcohol, triethanolamine and glycerol monostearate with water. Still other bases may utilize polyethylene glycols of different viscosities, depending upon the desired consistency. DMSO may be added to the lotion or ointment base in varying amounts as desired, generally up to around 50% by weight.

A suppository form may be made from a high viscosity polyethylene glycol 4,000, water and DMSO, which may be present in an amount of about 20% by weight.

The concentration of antimicrobial agent in the various dosage forms is, of course, commensurate with that normally utilized for the particular agent in conventional formulations for effective results for the intended route. Both the amount of antimicrobial agent and the amount of DMSO will be influenced by the type of effect desired. If a more localized effect is required, as for example, in treating a superficial infection with an antibacterial agent, lower amounts of agent and lower concentrations of DMSO may be called for. Where deeper penetration is desired, a higher concentration of DMSO may be desirable to promote adequate penetration. Where general systemic concentration of an agent is desired for a topical preparation, generally higher concentration of DMSO are desirable and the amount of agent may be included in the composition sufficient to provide the blood level desired.

The various pharmaceutical forms are desirably provided in determined amounts, as in containers of a given volume. These amounts may include 100% DMSO concentration containing the desired dose of the agent, or a lesser concentration of DMSO with a diluent and the physiologically active agent dose. Thus, for example, graduated ampules containing, say 5 cc. of 100% DMSO with the agent dissolved therein may be provided. The practitioner needs only open and dispense all or a determined part to a subject. Nasal spray bottles, aspirators, supositories, cotton tipped stick applicators, squeeze tubes may all be utilized for topical application.

The following illustrates the practice of the present invention with the various classes of antimicrobial agents.

SULFONAMIDES

The term "sulfonamide" is generally recognized as the generic name for derivatives of paraminobenzenesulfonamide (sulfanilamide). As used herein, the term "sulfonamide" is intended to mean sulfanilamide or those derivatives of sulfanilamide having therapeutic importance in the treatment of microbial diseases. The principal such sulfonamides are sulfanilamide, sulfadiazine, sulfamerazine, sulfamethazine, sulfaacetamide, sulfamylon, sulfisoxazole, sulfisomidine, sulfaethidole, sulfamethizole, sulfamethoxypyridazine, sulfadimethoxine, sulfamethoxazole, succinylsulfathiazole and phthalysulfathiazole. The sulfonamides are useful antibacterial agents, particularly in the treatment of urinary tract infections.

EXAMPLE 1

Three female dogs weighing between 11 and 13 kgs. were anaesthetized with sodium pentobarbital. Each animal was catheterized, its bladder emptied and the test solution instilled through the catheter. The various test solutions were made from the following basic solution. The gram percent and milligram percent figures relate to the number of such weight units per 100 cc. of a final liquid volume.

Sodium salicylate _____ 5 gm. percent.
Sodium sulfadiazine _____ 5 gm. percent.
Evans blue dye _____ 62½ mg. percent.
Sodium heparin _____ 125 mg. percent (145 units per mg.).

Three solutions were prepared from the basic solution by adding 15% v./v. of dimethyl sulfoxide to one; 15% v./v. acetone to the second; and 15% v./v. of isotonic saline to the third.

A sodium phosphate buffer system was added which was made from 0.05 M tribasic sodium phosphate, 0.033 M phosphoric acid, and 0.67 sodium chloride, to make a total of 75 cc. with a pH of 9.

With respect to each of the solutions, 75 cc. of such solution was instilled into the urinary bladder of one of the dogs.

All three test solutions were allowed to remain in the bladder for four hours. Blood samples were taken from the femoral veins prior to instillation and at 30, 60, 120 and 240 minutes after instillation. Serum sulfadiazine and salicylate levels were determined on each sample as the diazotized derivative and the ferric salt respectively. Lee and White three-tube clotting times were recorded at the same intervals. Gross post mortem inspection was made to detect the presence of the dye.

Referring to the drawings, as seen in FIG. 1, clotting time appeared significantly increased in the dimethyl sulfoxide animals as compared to the saline control animals.

Figure 3:
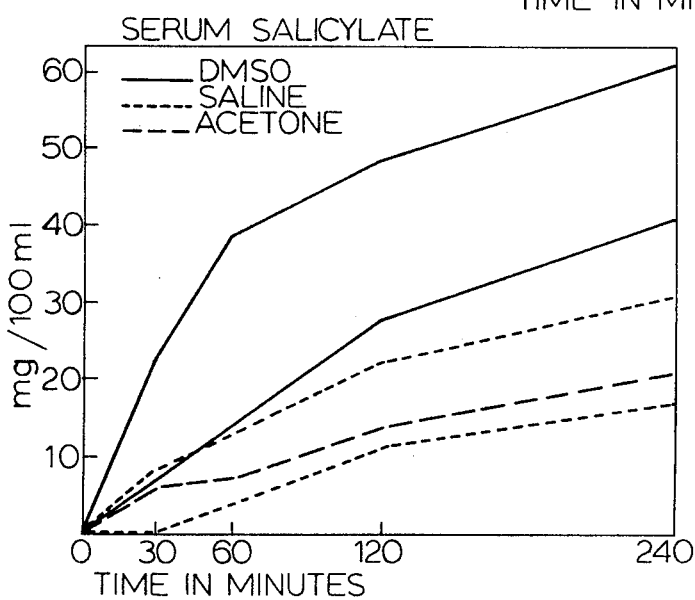

As seen in FIG. 3, a two- to four-fold increase of serum sulfadiazine was noted in the dimethyl sulfoxide animals beginning at the initial 30-minute period over either the acetone or saline controls.

As seen in FIG. 3, a two-to four-fold increase of serum salicylate was present in the dimethyl sulfoxide dogs over either the acetone or saline controls paralleling the serum sulfadiazine rise.

Direct inspection of the urinary bladders at the conclusion of the procedure revealed that in both the acetone and saline control animals, the Evans blue dye had penetrated through the mucosa into the muscular layers of the bladder and on opening the peritoneal cavity, the bladder had a faintly bluish tinge. In the dimethyl sulfoxide animals, however, the entire bladder was blue, and in addition, the anterior peritonium overlying the bladder, the retroperitoneal tissues and the contiguous small and large bowel had bluish tinges.

EXAMPLE 2

The following vaginal jelly may be prepared and buffered containing about 5% by weight of hexamethylene tetramine:

| | Gm. |
|---|---|
| Dimethyl sulfoxide | 15 |
| Water | 80 |
| Sulfisoxazole | 5 |

The above formulation may be employed as a twice-daily instillation of 10 to 20 ml. for the treatment of urethritus.

EXAMPLE 3

The following vaginal jelly may be prepared and buffered to a pH of about 4.0.

| | Percent |
|---|---|
| Ricinoleic acid | 0.8 |
| Acetic acid | 0.75 |
| Boric acid | 3.0 |
| Dimethyl sulfoxide | 15.0 |
| Oxyquinoline sulfate | 0.03 |
| Sulfisoxazole (Gantrisin) | 8.0 |

PENICILLIN

Penicillin is an antibiotic produced by growing strains of *Penicillium notatum* in deep vat cultures, from which the antibiotic is extracted by organic solvents and purified. Most of the available commercial preparations of penicillin consists of penicillin G, which is the most active and readily absorbed form or pencillin. Other naturally produced penicillins are designated in the art as F, X, K, O and V. "Synthetic" and "semi synthetic" penicillins are also commercially available. Synthetic penicillins are prepared by combining 6-aminopenicillanic acid obtained from the mold juice with various side chains, or can be prepared from other microorganisms such as in the case of Cephalosporins. The "synthetic" penicillins are stable in the presence of acid and resistant to the destructive effects of penicillinase produced by certain staphylococci. The term "pencillin" as employed herein is intended to include all of the "natural" and synthetic" penicillins having therapeutic importance in the treatment of microbial disease.

Penicillin is the drug of first choice in infections caused by pneumococcus, streptococcus, gonococcus, susceptible strains of Staphylococci, Treponema, Clostridia, *B. anthracis* and *Proteus mirabilis*. It is potentially the drug of choice with a secondary indication for use against infections by Bacteroides, Actinomyces, and Salmonella. The use of DMSO with penicillin is illustrated in the following examples:

EXAMPLE 4

A 20-year old male with bilaterally-infected ingrown toenails was treated with 90% dimethyl sulfoxide applied topically to the right great toe and 90% dimethyl sulfoxide plus 10 cc. of aqueous penicillin (i.e. penicillin G), containing 1 million units applied to the left great tow. After two days, there was no inflammation or infection in the toe treated with the dimethyl sulfoxide and penicillin composition, whereas the toe treated with dimethyl sulfoxide alone had a minimal subsidence of infection. The pencillin in the composition was therefore carried across the skin barrier so that it contacted the infected infection site. These results show that dimethyl sulfoxide enhanced penetration of the antibiotic.

Reference is further made to Examples 5 and 6 below which illustrate that penicillin-resistant microorganisms are rendered sensitive thereto by use of DMSO.

ANTIBIOTICS PRODUCED BY STREPTOMYCES SPECIES

Several species of Streptomyces yield useful antibiotics. Some of the more important of these antibiotics and the Streptomyces species which produce them are listed in the following table:

| Antibiotic: | Streptomyces species |
| --- | --- |
| (1) Streptomycin group— | |
| Streptomycin | Griseus. |
| Neomycin | Fradiae. |
| Kanamycin | Kanamyceticus. |
| Viomycin | Puniceus. |
| (2) Tetracycline group— | |
| Chlortetracycline | Aureofaciens. |
| Tetracycline | Aureofaciens. |
| Oxytetracycline | Rimosus. |
| (3) Macrolide group— | |
| Erythromycin | Erythreus. |
| Oleandomycin | Antibioticus. |
| Spiramycin A | Ambofaciens. |
| (4) Miscellaneous group— | |
| Chloramphenical | Venezuelae. |
| Novobiocin | Niveus or spheroides. |
| Cycloserine | Orchidaceus or garyphalus. |
| Vancomycin | Orientalis. |
| Nystatin | Noursei. |
| Amphotericin B | Streptomycete culture M4575. |

The streptomycin group of antibiotics which includes streptomycin, neomycin, kanamycin, paramomycin, and viomycin are bactericidal for a wide variety of bacteria, including the tubercle bacillus, but must be used with care in view of their renal and central nervous system toxicity. This group of drugs is effective against many penicillin-resistant organisms.

The tetracyclines, particularly tetracycline, oxytetracycline, chlortetracycline and demethylchlortetracycline, are the drugs of first choice in infections by Shigella, Brucella, Bacteroides, Eaton agent, and the Psittacosis-LGV-Trachoma viruses. They are possible drugs of choice (secondarily indicated) in Kebsiella infections, hospital borne coliform infections, and respiratory tract infections.

The macrolide group of antibiotics resembles penicillin in their action against gram-positive organisms, including beta hemolytic streptococci, pneumococci and staphylococci.

Chloramphenicol is useful in the treatment of certain rickettsial, viral and bacterial disorders not readily controlled by other antimicrobial agents.

Novobiocin is useful in certain serious micrococcal and Proteus infections.

Cycloserine is effective against both gram-positive and gram-negative organisms, and is used in the treatment of tuberculosis and urinary tract infections.

Vancomycin is effective against gram-positive organisms, and is useful against streptococci, pneumococci and staphylococci.

Nystatin is useful in treatment of mycotic infections, particularly those caused by Candida.

Amphotericin B manifests a broad spectrum of antimicrobial action against yeasts and fungi.

As previously indicated, DMSO may additionally act to increase the sensitivity of previously resistant strains of microorganisms to antibiotics. Following Examples 5 and 6 illustrate this aspect.

EXAMPLE 5

A 36-year old femal with an axillary abcess was attended surgically. The abcess was incised and cultured. The findings were: Staphylococcus, coagulase positive, resistant to penicillin, tetracycline and erythromycin, but sensitive to chloromycetin. An application of 50% aqueous dimethyl sulfoxide was made directly into the abcess three times daily. At the end of 48 hours the abcess was recultured and showed staphylococcus, coagulase positive, sensitive to penicillin, tetracycline, erythromycin and chloromycetin. It may be suggested that dimethylsulfoxide alters sensitivity of the bacteria to antibiotics, perhaps by allowing an increased penetration of the antibiotic into the bacterium.

EXAMPLE 6

A 60-year old male subject, with gangrene of the right great toe, secondary to peripheral arteriosclerosis with diabetes, had a culture performed on his toe drainage. The findings were: Staphylococcus, coagulase positive, sensitive to chloromycetin and erythromycetin, resistant to penicillin and tetracycline.

Application was made topically with 50% aqueous dimethyl sulfoxide every four hours for 24 hours, and then a reculture of the toe drainage was made. It showed: Staphylococcus, coagulase positive, sensitive also to penicillin and tetracycline.

EXAMPLE 7

The following lotion for topical application to areas infected with yeast organisms may be prepared:

| | |
| --- | --- |
| Dimethyl sulfoxide | 80 gm. |
| Carbowax 1000 | 10 gm. |
| Water | 10 gm. |
| Nystatin (USP) | 100,000 units/cc. |

Antiviral agents

Illustrative of diseases caused by viruses are smallpox, mealses, encephalitis, herpes, rabies, etc.

While many drugs are useful in treating viruses in vitro, very few are successful in treating in vivo virus disorders. The most successful of the current antiviral agents are idoxuridine (5-iodo-2'-deoxyuridine), N-methylisatin beta thiosemicarbazone, and amantadine. Idoxuridine is useful in treating herpes simplex keratitis, and N-methylisatin betal thiosemicarbazone has proved useful in preventing smallpox after exposure to this disease. In addition, as mentioned previously, chloramphenical is useful in the treatment of certain viral disorders. Reference is made to foregoing Examples 5 and 6 for use of chloramphenical in treating infection.

EXAMPLE 8

The following lotion may be formulated incorporating idoxuridene at a concentration 0.1 gm./cc. of the following lotion base:

| | Percent |
| --- | --- |
| Dimethyl sulfoxide | 75 |
| Water | 14 |
| Glycerine | 10 |
| Sodium carboxymethylcellulose | 1 |

The foregoing lotion may be employed in the treatment of herpes simplex by cutaneous application directly to skin lesions, q.i.d.

What I claim is:

1. A method of enhancing the penetration into and across the stratum or mucous membrane barrier of a human or animal subject of an antimicrobial agent selected from the group consisting of sulfonamides, penicillins, antiviral agents and antibiotics produced by a species of Streptomyces which comprises the concurrent topical administration to the subject of an amount of said agent effective to inhibit the growth of microorganisms superficially and at an underlying tissue or circulatory system locus of growth internally of said stratum corneum or mucous membrane barrier and an amount of DMSO sufficient to effectively enhance penetration of said agent to said locus of growth to achieve the desired antimicrobial effect, said amount of DMSO being at least 10% by weight of the composition in which it is applied, said agent continuing to penetrate to the underlying tissue and into the circulatory system.

2. A method as in claim 1 and wherein the said agent is applied to the intact skin in a composition which includes said DMSO and wherein the DMSO in said composition is at least about 50% by weight of the composition.

3. A method as in claim 1 and wherein said agent is applied to mucous membrane of a body cavity in a composition which includes said DMSO and wherein the DMSO in said composition is at least about 10% by weight of the composition.

4. A method as in claim 1 and wherein said agent is applied to said membrane in a composition which includes said DMSO.

5. A method as in claim 4 and wherein said composition contains a pharmaceutically acceptable thickening agent in an amount sufficient to materially increase the viscosity thereof, whereby to facilitate topical application.

6. A method as in claim 5 wherein said composition is in the form of an ointment.

7. A method as in claim 5 wherein said composition is in the form of a lotion.

8. A method as in claim 5 and wherein said composition is in the form of a suppository.

9. A method as in claim 1 wherein the antimicrobial agent is a sulfonamide.

10. A method as in claim 1 wherein the antimicrobial agent is a penicillin.

11. A method as in claim 1 wherein the antimicrobial agent is an antibiotic produced by a specie of Streptomyces.

12. A method as in claim 11 wherein the antibiotic is tetracycline.

13. A method as in claim 11 wherein the antibiotic is erythromycin.

14. A method as in claim 11 wherein the antibiotic is chloramphenical.

15. A method as in claim 1 wherein the antimicrobial agent is an antiviral agent.

16. A method as in claim 1 wherein the DMSO in said composition in which it is applied is up to about 90% by weight thereof.

17. A method as in claim 1 wherein the DMSO is present in an amount between about 50% and about 90% by weight of the composition in which it is applied.

18. A method as in claim 2 wherein the DMSO in said composition is up to about 90% by weight thereof.

19. A method as in claim 1 wherein the amount of said antimicrobial agent is sufficient to provide a localized effect in the tissue underlying the stratum corneum or mucous membrane barrier.

20. A method as in claim 1 wherein the amount of said antimicrobial agent is sufficient to provide a general systemic concentration effective to achieve the desired antimicrobial effect, and the amount of DMSO is sufficient to enhance the penetration of the antimicrobial agent into the circulatory system of the subject.

21. A method as in claim 1 wherein the antimicrobial agent is selected from the group consisting of penicillins and an antibiotic produced by a species of Streptomyces and the microorganisms whose growth is to be inhibited have previously developed a resistance to said antimicrobial agent.

References Cited

UNITED STATES PATENTS

| | | | |
|---|---|---|---|
| 2,942,008 | 6/1960 | Lubowe | 252—364 |
| 3,044,936 | 7/1962 | Achelis et al. | 424—337 X |
| 3,067,096 | 12/1962 | Trace et al. | 424—337 X |
| 3,334,012 | 8/1967 | Herschler | 424—337 |
| 3,361,555 | 1/1968 | Herschler | 71—103 |
| 3,499,961 | 3/1970 | Dobson et al. | 424—337 X |
| 3,546,339 | 12/1970 | Leeson et al. | 424—337 X |
| 3,549,771 | 12/1970 | Herschler | 424—337 |
| 3,558,434 | 1/1971 | Herschler | 195—81 |
| 3,592,936 | 7/1971 | Marcus et al. | 424—337 |
| 3,551,554 | 12/1970 | Herschler | 424—337 X |

FOREIGN PATENTS 810,377  3/1959  Great Britain.

OTHER REFERENCES

Faust et al.: American Perfumer 77(i): 23–26, January 1962.

Marson: Boll. Chimico Form 102: 109–111, 114, 122–124, February 1963.

Brown et al.: J. Pharm. Pharmacol 15: 688–692, October 1963.

SHEP K. ROSE, Primary Examiner

U.S. Cl. X.R.

424—227, 228, 271, 337